United States Patent Office 2,700,688
Patented Jan. 25, 1955

2,700,688

1-BROMO- AND 1-CHLORO-1,1-DIFLUORO-2-ALKENES

Grant Crane, Akron, Ohio, and William S. Barnhart, Cranford, N. J., assignors to The Firestone Tire & Rubber Company, Akron, Ohio, a corporation of Ohio No Drawing. Application December 14, 1953, Serial No. 398,238

7 Claims. (Cl. 260—653)

This application is a continuation-in-part of our application Serial No. 136,425, filed December 31, 1949, now U. S. Patent No. 2,686,207.

This invention relates to 1-bromo- and 1-chloro-1,1-difluoro-2-alkenes which are preferably obtained by dehydrobromination of adducts formed from (1) bromochlorodifluoromethane or dibromodifluoromethane, and (2) an olefin or a chloro-olefin.

The production of the adducts from ethylene and their dehydrobromination is illustrated by the following equations, in which X stands for bromine or chlorine.

$$CH_2=CH_2+BrXCF_2 \rightarrow BrCH_2-CH_2-CF_2X$$
$$BrCH_2-CH_2-CF_2X \rightarrow CH_2=CH-CF_2X(+HBr)$$

The adducts may be obtained from chloro-olefins which contain no more than two carbon atoms and from longer chain olefins and chloro-olefins. The reactions with the longer chain starting materials are illustrated by the following equations, in which X stands for either bromine or chlorine; R and R' are hydrogen, alkyl or chloroalkyl; and —$CH_2R'$ contains at least as many carbons as R, but not more than twelve.

$$RCH=CHCH_2R'+BrXCF_2 \rightarrow$$
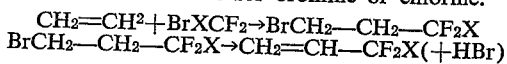
$$XCF_2-CHR-CHBr-CH_2R' \rightarrow$$
$$XCF_2-CR=CH-CH_2R'(+HBr)$$

These chloro- and bromo-difluoro-2-alkenes are valuable intermediates for the production of diolefins and other compounds. The chlorine or second bromine may be removed from the 1-carbon atom by further dehydrohalogenation, as with an acid catalyst, and the resulting 1,3-diolefins may be polymerized into rubbery polymers.

The olefins and chloro-olefins which may be used in producing the adduct include, for example, the following:

| | |
|---|---|
| Ethylene | Biallyl |
| Propylene | Cyclohexene |
| Isobutylene | Cyclopentene |
| 1-butene | Allyl chloride |
| 2-butene | Crotyl chloride |
| Pentene | 1,4-dichloro-2-butene |
| Isopentene | 3-chlorocyclopentene |
| Hexene | Methallyl chloride |
| Isohexene | Octadecene-9 |
| Octene | Heneicosene-9 |
| Diisobutylene | Heptacosene-13 |
| Decene | |

Dibromodifluoromethane is a known compound. Bromochlorodifluoromethane may be produced by reacting a mixture of 25 per cent to 45 per cent of chlorodifluoromethane with from 75 per cent to 55 per cent of bromine (all percentages being on the basis of the total weight of chlorodifluoromethane and bromine) at temperatures between 300° C. and 1000° C. The bromochlorodifluoromethane may be separated by distillation from the resultant reaction mixture, and has a density of about 1.9 and a boiling point of about 0° C. at atmospheric pressure.

The dehydrobromination of the adduct is effected by any of the usual alkaline dehydrohalogenating agents including, for example, sodium hydroxide, potassium hydroxide, other alkali metal hydroxides, alkaline earth metal hydroxides, lime, organic bases, etc. An inert solvent such as an etherified polyalcohol is advantageously used during the dehydrobromination.

In the alkaline dehydrobromination of the adduct, the tendency is to remove only the elements of hydrobromic acid with the production of the alkene and this may be followed by catalytic acid dehydrohalogenation to produce a diolefin.

The dehydrobromination of adducts formed from chloroolefins is generally similar. On removal of the chlorine originally present in the chloro-olefin, a more highly unsaturated compound is obtained.

The following examples illustrate the process. Each example starts with the production of an adduct.

EXAMPLE 1

1-chloro-1,1-difluoro-2-methyl-2-butene

Addition of $CF_2BrCl$ to 2-butene.—The nickel liner for a steel bomb of 1220 cc. capacity was chilled to the temperature of frozen carbon dioxide and charged with 125 g. (0.75 mole) of $CF_2BrCl$, 66 cc. of liquid 2-butene at —78° C. (calcd. 0.75 mole) and 14 cc. of 29 per cent acetyl peroxide in dimethyl phthalate. The liner was inserted into the bomb, which was shaken 24 hours at 60° C. Distillation of the product yielded 26.3 g. (18.3%) of 3-bromo-1-chloro-1,1-difluoro-2-methylbutane. The center cut had the following constants: $b_{30}=56$-$7°$, $n_D^{25}=1.4292$, $d^{20}=1.512$. Molecular refraction was 38.0 (observed), 37.7 (calculated).

Purification of 3-bromo-1-chloro-1,1-difluoro-2-methylbutane.—The crude adduct was washed with concentrated sulfuric acid, water, dilute sodium bicarbonate solution, dried over anhydrous magnesium sulfate and distilled at atmospheric pressure. The properties obtained are $b_{736}=140$-$1°$, $n_D^{25}=1.4299$, $d^{25}=1.508$. Molecular refraction was 38.0 (observed), 37.7 (calculated). The disagreeable odor of the crude product was completely eliminated by the purification.

DISCUSSION

The dehydrobromination occurs in accordance with the following equation, in which X may be either chlorine or bromine:

$$XCF_2.CHMe.CHBr.CH_3 \rightarrow XCF_2.CMe{:}CH.CH_3$$

The alkaline reagent removes bromine from the 3-position to form hydrogen bromide. No appreciable amount of diene is produced.

Dehydrobromination of 3-bromo-1-chloro-1,1-difluoro-2-methylbutane.—The apparatus consisted of a 250-cc. three-neck flask fitted with a glass stirrer, a dropping funnel and a short distillation column. The distillate was collected by means of traps cooled with ice-water and frozen carbon dioxide in series.

A mixture of 50 cc. of dimethoxytetraglycol and 18.4 g. of 85 per cent potassium hydroxide was heated to its boiling point in the flask. A solution of 30.9 g. (0.14 mole) of 3-bromo-1-chloro-1,1-difluoro-2-methylbutane ($CF_2Cl.CHMe.CHBr.CH_3$) and 15 cc. of dimethoxytetraglycol was added through the dropping funnel while heating and stirring. Heating and stirring were continued one hour. The ice-water trap contained water and an organic layer. The trap of frozen carbon dioxide contained about 1.5 cc. of liquid. The organic layer (lower) in the ice-water trap was separated, dried over anhydrous magnesium sulfate and distilled at atmospheric pressure. The following fractions were obtained:

| Fraction | B. P., degrees | Weight, g. | $n_D^{25}$ | $d^{25}$ |
|---|---|---|---|---|
| No. 1 | 60–82 | 1.0 | 1.3915 | |
| No. 2 | 82–6 | 2.2 | 1.3895 | |
| No. 3 | 86–7.5 | 5.5 | 1.3924 | |
| No. 4 | 87.5–100 | 1.5 | 1.4090 | 1.105 |
| Residue | | 6.0 | | |

Titration of an aliquot of the alkaline residue in the original reaction flask with standard silver nitrate indicated that 0.158 equivalents of halogen acid had been removed from 0.14 mole of starting material.

The molecular refraction of fraction No. 3 which was taken as $CF_2Cl.CMe{:}CH.CH_3$ was 30.2 (observed), 29.5 (calculated). The crude yield was 44 per cent.

EXAMPLE 2

1-bromo-1,1-difluoro-2-methyl-2-butene

*Addition of $CF_2Br_2$ to 2-butene.*—In this reaction there were used 209.8 g. (2 moles) of dibromodifluoromethane, 112 grams (2 moles) of butene-2, and 15 ml. of a 30 per cent solution of acetyl peroxide in dimethyl phthalate. The dibromodifluoromethane and butene-2 were charged in an autoclave at $-20°$ C. The acetyl peroxide solution was added, and the autoclave closed up and heated for 22 hours at 60° C. At the end of this time the unreacted gases were bled off from the autoclave into a trap maintained at $-70°$ C. The liquid remaining in the autoclave amounted to 219 grams, and was subjected to fractional distillation at 50 mm. The product coming over in the range 77–79° C. was substantially pure 1,3-dibromo-1,1-difluoro-2-methylbutane, and amounted to 161 grams (0.6 mole). On this basis, the conversion was 67 per cent and the yield was 30 per cent. The compound 1,3-dibromo-1,1-difluoro-2-methylbutane obtained has the following properties: $n_D^{20}=1.4588$; $d^{24}=1.786$; molecular refractivity: 40.6 (calculated), 40.7 (found): bromine: 60.2% (calculated), 60.7% (found); fluorine: 14.3% (calculated), 14.7% (found).

*Dehydrobromination of 1,3-dibromo-1,1-difluoro-2-methylbutane.*—Twenty grams (0.5 mole) of sodium hydroxide was dispersed in a solution of 100 ml. of dimethoxytetraglycol and 10 ml. of water by heating and stirring. The alkali solution was added dropwise to 133 g. (0.5 mole) of 1,3-dibromo-1,1-difluoro-2-methylbutane below 25° C. After standing overnight, the product was poured into water and separated. Fractionation gave 44 g. of starting material and 44 g. of a new compound for a yield of 80 per cent and a conversion of 33 per cent. This compound distilled at 103–5° C. with some decomposition and had an $n_D^{20}$ of 1.425 and $d_4^{20}$ of 1.423 for a molecular refraction of 33.4 against 33.5 calculated for $CF_2Br\text{—}CMe=CH\text{—}CH_3$, 1-bromo-1,1-difluoro-2-methyl-2-butene.

EXAMPLE 3

1-chloro-1,1-difluoro-2-butene

*Addition of $CF_2BrCl$ to propylene.*—In a steel bomb of 1220 cc. capacity, at $-25°$ C. were placed 160 g. (0.97 mole) of $CF_2BrCl$ and 17 cc. of 29 per cent acetyl peroxide in dimethyl phthalate. After warming the closed bomb to room temperature propylene was introduced. The bomb was shaken from time to time to facilitate solution of the propylene, and more propylene was added until there was substantially 1 mole present. The bomb was then shaken 24 hours at 60° C. Distillation of the crude product yielded 57.6 g. (32.2%) of 3-bromo-1-chloro-1,1-difluorobutane, $b_{50}=43.5°$, $n_D^{25}=1.4162$, $d^{20}=1.550$. Molecular refraction was 33.7 (found), 33.1 (calculated). Also obtained was a fraction 31.6 g. (15.1%) corresponding to $C_7H_{12}F_2BrCl$ ($CF_2BrCl + 2C_3H_6$), $b_{20}=89\text{–}90°$, $n_D^{25}=1.4356$, $d^{20}=1.380$. Some $CF_2BrCl$ was recovered unchanged.

The same adduct was also formed using benzoyl peroxide, as follows: A steel autoclave of 1220-ml. capacity was chilled to the temperature of frozen carbon dioxide, and 500 g. (3.02 moles) of $CF_2BrCl$ and 18.5 g. of benzoyl peroxide were introduced. The autoclave was closed, and gaseous propylene was charged to the autoclave until approximately an equimolecular amount was introduced. The autoclave was then heated at 85° C. with agitation for 20 hours. After cooling the autoclave was opened and the gaseous products were led through a trap chilled with frozen carbon dioxide. 210 g. of unreacted $CF_2BrCl$ and 100 g. of unreacted propylene were recovered. The product was then distilled at atmospheric pressure yielding 113.4 g. of 3-bromo-1-chloro-1,1-difluorobutane boiling at 117–120° C. The distillation residue (66.5 g.) contained higher condensation products of propylene and $CF_2BrCl$ and decomposition products of benzoyl peroxide. The yield based on unrecovered starting material was 31.2 per cent.

*Purification of 3-bromo-1-chloro-1,1-difluorobutane.*—The constant-boiling fractions of the propylene-$CF_2BrCl$ adduct were shaken three times with concentrated sulfuric acid, washed with water and with sodium bicarbonate solution and dried over anhydrous magnesium sulfate. Distillation at atmospheric pressure gave a fraction, $b.$ 117.2–117.3°/737.9 mm., $n_D^{25}=1.4175$, $d_4^{25}=1.5737$. Molecular refraction was 33.1 (found), 33.1 (calculated). The liquid formed crystals and remelted below $-120°$ C.

*Dehydrobromination of 3-bromo-1-chloro-1,1-difluoro-1-chlorobutane.*—The apparatus consisted of a small three-neck flask fitter with a glass stirrer, a dropping funnel and a reflux condenser. A tube from the top of the condenser led to an ice-water trap and a trap for frozen carbon dioxide in series.

A mixture of 10.0 g. (0.25 mole) of sodium hydroxide pellets and 25 cc. of dimethoxytetraglycol were heated in the flask forming a slurry and allowed to cool to room temperature. A mixture of 20.8 g. (0.1 mole) of $CF_2Cl.CH_2.CHBr.CH_3$ and 5 cc. of dimethoxytetraglycol was added with stirring over a period of 70 minutes. The reaction started at room temperature, but the reaction proceeded much more readily at the boiling point of the dimethoxytetraglycol. Air was circulated through the reflux condenser to prevent distillation of any high-boiling material. About 0.3 g. of liquid passed through the ice-water trap and collected in the second trap. About 10 cc. of liquid collected in the ice-water trap. Distillation of the 10 cc. of liquid yielded 7.6 g. of liquid, $b.=60\text{–}3°$, $n_D^{25}=1.3640$, $d_4^{25}=1.125$. Molar refraction was found to be 25.0, compared to 24.9 calculated for a difluorochlorobutene. The alkaline residue in the flask gave a strong test for bromide ion. Titration of an aliquot with standard silver nitrate solution indicated that 0.111 equivalent of hydrogen halide had been removed from 0.1 mole of starting material.

Similar results were obtained using potassium hydroxide in place of sodium hydroxide and diethylene glycol in place of dimethoxytetraglycol.

The difluorochlorobutene slowly decolorized bromine in carbon tetrochloride and reduced neutral potassium permanganate in acetone. Qualitative analysis by sodium fusion indicated that chlorine and fluorine were present and bromine absent. The compound gave an immediate white precipitate with alcoholic silver nitrate indicating the presence of allylic chlorine.

Oxidation studies have shown that the double bond in the alkene dehydrobromination products is in the 2-position. For example, the oxidation with cold neutral potassium permanganate solution of the dehydrohalogenation product of 3-bromo-1-chloro-1,1-difluorobutane gave acetic acid and chlorodifluoroacetic acid in good yield. No ketones were formed and no other acids could be found. The isolation of these degradation products indicates that the reaction proceeds primarily as follows:

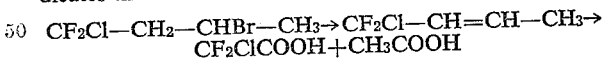

$$CF_2Cl\text{—}CH_2\text{—}CHBr\text{—}CH_3 \rightarrow CF_2Cl\text{—}CH=CH\text{—}CH_3 \rightarrow$$
$$CF_2ClCOOH + CH_3COOH$$

However, it is recognized that relatively small amounts of isomeric materials, such as the product with the double bond in the 3-position, may be present and escaped detection by the oxidation procedure.

The chlorine atom in the $-CF_2Cl$ group is more difficult to remove than chlorine in a $-CCl_3$ group.

Dimethoxytetraglycol may be replaced by other inert solvents such as, for example, ethylene glycol, diethylene glycol, the cellosolve and carbitol solvents and their etherification products. The lower alcohols may be used as solvents, but there is some tendency toward etherification rather than the desired dehydrohalogenation. The reaction may also be carried out with solid alkali in the absence of any solvent.

What we claim is:

1. 1,1-difluoro-2-butenes of the class in which the 1-position is substituted by a halogen of the class consisting of bromine and chlorine, and further of the class consisting of butenes in which the 2 and 4-positions are unsubstituted and of butenes in which the 2-position is alkyl-substituted and in which the 4-position is alkyl-substituted provided, however, that the number of carbon atoms in the group occupying the 4-position, including the number 4 carbon atom itself, is not over twelve and is at least equal to the number of carbon atoms in the alkyl substituted in the 2-position.

2. 1,1-difluoro-2-butene in which the 1-position is substituted by a halogen of the class consisting of bromine and chlorine.

3. 1,1-difluoro-2-methyl-2-butene in which the 1-position is substituted by a halogen of the class consisting of chlorine and bromine.

4. The process of dehydrobromination which comprises by means of an alkaline reagent removing hydrogen bromide from a compound having the formula

XCF₂—CHR—CHBr—CH₂R' in which X is a halogen from the group consisting of chlorine and bromine, R and R' are from the group consisting of hydrogen, alkyl and chloroalkyl, and CH₂R' contains at least as many carbons as R but no more than twelve; whereby there is obtained a 1,1-difluoro-olefin substituted in the 1-position by a halogen from the class consisting of chlorine and bromine, said alkaline reagent being from the class consisting of alkali metal hydroxides, alkaline earth metal hydroxides, lime and organic bases.

5. The process of dehydrobromination which comprises by means of an alkaline reagent removing hydrogen bromide from a compound having the formula

XCF₂—CH₂—CHBr—CH₂R in which X is a halogen from the group consisting of chlorine and bromine, and R is from the group consisting of hydrogen, alkyl and chloroalkyl, and contains no more than eleven carbon atoms; whereby there is obtained a 1,1-difluoro-olefin substituted in the 1-position by a halogen from the class consisting of chlorine and bromine, said alkaline reagent being from the class consisting of alkyl metal hydroxides, alkaline earth metal hydroxides, lime and organic bases.

6. The process of dehydrobromination which comprises by means of an alkaline reagent removing hydrogen bromide from a compound having the formula

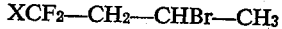
XCF₂—CH₂—CHBr—CH₃ in which X is a halogen from the group consisting of chlorine and bromine; whereby there is obtained 1,1-difluoro-2-butene substituted in the 1-position by a halogen from the class consisting of chlorine and bromine, said alkaline reagent being from the class consisting of alkaline metal hydroxides, alkaline earth metal hydroxides, lime and organic bases.

7. The process of dehydrobromination which comprises by means of an alkaline reagent removing hydrogen bromide from a compound having the formula

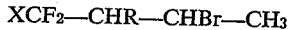
XCF₂—CHR—CHBr—CH₃ in which X is a halogen from the group consisting of chlorine and bromine, R is an alkyl group which contains no more than eleven carbon atoms; whereby there is obtained a 1,1-difluoro-2-olefin substituted in the 1-position by a halogen from the class consisting of chlorine and bromine and by said R in the 2-position, said alkaline reagent being from the class consisting of alkali metal hydroxides, alkaline metal earth hydroxides, lime and organic bases.

References Cited in the file of this patent

UNITED STATES PATENTS 2,686,207    Crane et al. _____ Aug. 10, 1954